Feb. 18, 1947.    H. JOACHIM    2,416,007

METHOD OF CLARIFYING AND STABILIZING BEER AND LIKE BEVERAGES

Filed April 13, 1943

INVENTOR,
HANS JOACHIM
BY
Chas. E. Townsend.
ATTORNEY.

Patented Feb. 18, 1947

2,416,007

UNITED STATES PATENT OFFICE 2,416,007

METHOD OF CLARIFYING AND STABILIZING BEER AND LIKE BEVERAGES

Hans Joachim, San Francisco, Calif., assignor to The Inerto Company, San Francisco, Calif., a firm Application April 13, 1943, Serial No. 482,869

9 Claims. (Cl. 99—48)

This invention relates to a process for treating beer or similar beverages, whereby the beverage is improved in clarity, stability and qualities of brilliance and sparkle, and which preserves and enhances taste and bouquet of the product.

There are varying digestive and precipitation treatments utilizer in the brewing industry for removing foreign and partially insoluble substances from beer.

An object of the invention is, generally stated, to provide a process for treatment of beer for removal of undesirable insoluble or partially insoluble substances, such as proteid colloids, etc., therefrom which are responsible for deterioration of beer as to cause instability, chill haze, lack of clarity, change of color, loss of flavor and aroma, etc. It is necessary, when processing beer or other beverages of like characteristics, not only to remove completely the unwanted substances contained therein but to refrain from adding substances which are undesirable in the finished product. It is also necessary to retain the original good qualities of the brew.

In the production of beer, variances in temperature or vibratory motion cause certain proteids within the beer to be thrown partially out of balance so as to become less soluble and resultantly colloidal. Consequently, cloudiness develops and the beer is not stable. The presence of colloidal matter within the beverage deteriorates it rapidly and, of course, seriously impairs the taste, appearance and aroma thereof.

Because of their minute size or consistency, the undesirable proteids can not be filtered satisfactorily by any known mesh filter means, and it, therefore, is necessary to introduce an additive which adsorbs or attracts these proteids in order to cause precipitation thereof. As it is common practice in breweries to keep beer at a low temperature during storage, certain proteids at that time become less soluble, become colloidal and give the beer a chill haze.

Some heretofore known precipitation processes have used powdered and granular forms of additives, designed to remove unwanted material from the beer by adsorption. However, powdered and granular substances, introduced in a dry or a semi-dry state, are not completely adequate for the purposes for which they are designed because they do not contact all of the unwanted substances in the beer, due to their physical nature. Further, the substances in a powdered or granular form usually become gelatinous in the beer and tend to obstruct filtering mediums, and thereby slow down the process of manufacture of the beer. Also, because of the bad effect upon the filtering mediums, some of the introduced additive in dry or semi-dry form is left within the beer, together with substances which are supposed to be removed by the additive, and, consequently, an imperfect beverage results. Further, these known precipitation processes apply an additive not to the beverage after brewing and just prior to packaging but to the mash itself.

Objects of my invention are, therefore, to provide a process for stabilizing and clarifying beer or like liquids adapted to remove unwanted substances rapidly therefrom just prior to packaging; to provide a method of treating beer and the like which is more thorough and rapid in the removal of unwanted substances than has heretofore been known; which can be, and preferably is, applied to the beverage just prior to packaging; which can be, and preferably is, introduced in aqueous form to the beverage in the form of a non-swellable colloidal dispersion which can be thoroughly mixed with said beverage; which does not deleteriously affect the intended good character of the beverage but rather enhances the good qualities thereof; and which is relatively inexpensive of preparation and application.

I have found that the use in a comparatively dense liquid form of a selective adsorptive additive of a magnesium silicate as found in its natural state particularly in certain desert regions of the far West, and which can be thoroughly dispersed within the brew, is extremely advantageous and effective. The adsorption agent employed must not only be of the kind which possesses an electrical charge adapted to adsorb unwanted substances in colloidal state, as undesirable cleavage products of proteids within the beverage, but must also be of a composition which maintains the normal pH or normal hydrogen ion relationship characteristic of beer.

Typical analyses of this natural mineral product are represented by the following:

Example 1

| | Per cent |
|---|---|
| Silica ($SiO_2$) | 53.68 |
| Alumina ($Al_2O_3$) | .60 |
| Lime (CaO) | .52 |
| Magnesia (MgO) | 25.34 |
| Sodium oxide ($Na_2O$) | 3.00 |
| Potassium oxide ($K_2O$) | .07 |
| Water ($H_2O$) | 15.52 |
| Chlorine (Cl) | .31 |
| Lithium (Li) | Approximately 1.00 |

It is noted that the magnesia content is quite high and that the alumina content is relatively very low. This formula represents the analysis resulting from the selection of the more enriched portions of the ore generally appearing in nodular form.

Example 2

|  | Per cent |
|---|---|
| Silica (SiO₂) | 30.20 |
| Iron (Fe₂O₃) | .90 |
| Alumina (Al₂O₃) | .86 |
| Lime (CaO) | 24.22 |
| Magnesia (MgO) | 12.31 |
| Lithium (Li) | .96 |
| Ignition loss | 28.42 |
|  | 97.87 |

Here is noted an excess of calcium oxide over magnesia and also that the alumina content is extremely low as compared with both the magnesia and calcium oxide (CaO) content. This formula represents the ordinary mill run of the ore.

This natural mineral product has the characteristics of swelling from ten to twelve times or more its own weight when placed in water, and also of becoming very gelatinous. If introduced into the beer in dry form it gels and balls up so as seriously to interfere with the purification processes.

The insoluble mineral composition used in my process is powdered in extremely fine particles and preferably mixed with water, as later described, in a suitable mixer or homogenizer to produce a colloidal dispersion having a high viscosity.

This natural magnesium calcium silicate having selective adsorptive characteristics, i. e. a particular electrical charge in aqueous form, is injected into the beer within the transfer conduit through a mixer injector under suitable pressure. It should be noted that the swellable characteristics of the powdered material are removed after being dispersed in water and the already fine particles of the additive are further broken up during this process; hence exposing a far greater uneven surface area of the composition particles.

By the injector means later mentioned the additive in liquid form is thoroughly mixed into the flow of beer and consequently contacts all of the unwanted colloidal substances at that time, just prior to packaging. The beverage, having been chilled, the proteids therein have become less soluble and they, together with certain foreign substances which have been picked up by the beverage during the process of manufacture, can be removed just prior to the packaging of the beer in its final form. Further, I have found it advisable to maintain the temperature of the beer to be treated below approximately thirty-five degrees (35°) Fahrenheit during treatment as adsorption of colloidal proteids is then more rapid and complete.

The addition of the additive to the beverage is preferably accomplished during transfer from storage to packaging. Sequentially, the beer is first conducted from a place of storage where it has been stored a suitable time, is preferably then filtered, the additive is injected into the flow of beer and thoroughly mixed therein through means which will shortly appear, is then subjected to a flocculating agent, and then refiltered prior to being packaged and later pasteurized. Preferably, therefore, in my process the addition of the adsorptive composition, in the form of a colloidal dispersion to the beer, is accomplished during the latter stages of manufacture or production as contained therein.

As previously noted, the additive has selective characteristics, due to its particular electrical charge, which reacts only upon those components of the beer which are undesirable. The electrical charge can be likened to the magnetic attraction of an electrically charged magnet for iron filings, i. e. the particles in colloidal dispersion attract the unwanted substance within the beer and grow in size during the period of exposure of the additive to the said beer.

In practice, the natural mineral as it comes from the mine and ranging in composition anywhere between the formulae of Examples 1 and 2, above, is ground to approximately a size to pass a 200-mesh screen.

The additive to be produced therefrom is mixed and prepared in commercial form by taking for treatment of one hundred barrels (approximately thirty-one hundred gallons) of beer from two to four pounds of ground mineral and mixing it in a high-speed agitator operated at approximately seventeen hundred revolutions per minute with from five to eight gallons of water until a thoroughly homogeneous smooth mass results having the consistency of a pasty or batter-like flowable mix. In this form it remains in comparatively stable suspension with little or no tendency of the mineral to separate. Obviously, if desired, further water can be added at any time to thin the mixture, but practice shows the proportions above given are preferable to produce best results with the usual marketable beers.

Figure 1:
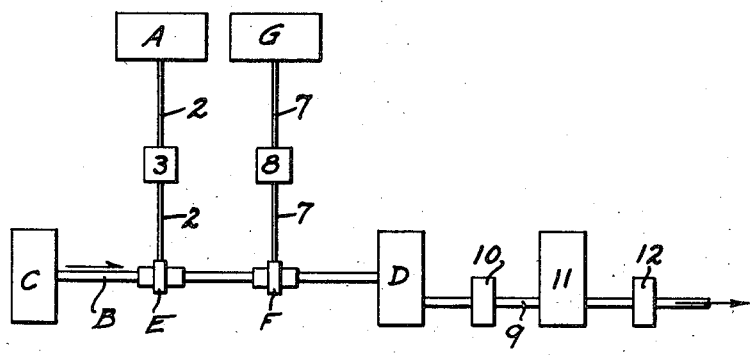
Fig. 1 is a flow diagram showing a preferred form of practicing my process.

The drawing (Fig. 1) is a schematic layout of apparatus suitable for the practice of the process. A is a tank or source of supply for the additive in aqueous flowable form as above described. B is the beer line through which the beer to be acted upon flows under suitable pressure from storage tank C to tank D.

The mineral additive from tank A is admitted to the beer line through pipe 2 and conventional chemical feeder 3 in metered quantity per one hundred barrel unit on the basis above described, to-wit, two to four pounds of mineral in suspension in from five to eight gallons of water. The mode of admission of this aqueous additive is important. Preferably it is done by apparatus like that shown in the recently issued patent to Joachim and Burton, Number 2,307,509, dated January 5, 1943, for "Means for mixing and distributing fluids" and diagrammatically represented in Fig. 1 at E.

Figure 2:
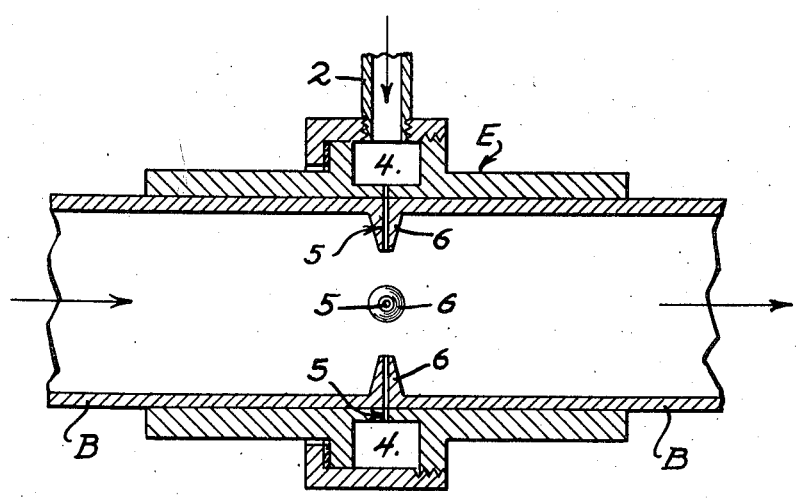
Fig. 2 is a section of a preferred form of distributor used in my process.

In Fig. 2 a sectional view of apparatus E is shown, in which B represents the beer line. E is a coupling member or sleeve embracing pipe B and enclosing an annular manifold 4 running around the pipe B and communicating at suitable intervals with the interior of the pipe by a series of outlet ports 5, through which the liquid from line 2 is delivered under suitable pressure to the liquid flowing through pipe B. The ports 5 may terminate in nozzles 6 by which the miscible solution of additive is made to penetrate the perimeter of the current flow and converge hub-like towards the axis of the flow. By this means the distribution is enhanced by the fact that the radial projections 6 operate to interrupt the current flow of the beer and set up eddying currents which, in turn, pick up and break the incoming streams of high viscosity additive and more completely effect diffusion and admixture of the beer and additive.

The beer additive so mixed continue their flow through pipe B, and at point F there is introduced into the flow a suitable reducing and flocculating agent. This agent, in practice, is normally a solution of sodium bisulphite and water in the proportion of approximately twenty-five (25) parts of bisulphite to one million (1,000,000) parts of beer or otherwise expressed as one (1) pound of bisulphite to two and one-half (2½) gallons of water for one hundred (100) barrels of beer.

This reducing and flocculating agent is contained in tank G and is admitted to the beer line through a pipe 7 and a chemical feeder 8 to a manifold distributor F, which is in all respects similar to distributor E above described. This agent is introduced to increase further the rapidity of precipitation. I have found that sodium bisulphite is eminently suitable for reduction of the oxygen content of beer, forming a salt which contributes to the flocculation and precipitation of the colloidally suspended compound together with the undesirable colloids adsorbed thereby. Obviously, any suitable flocculating substance may be used in lieu of sodium bisulphite. The precipitate from the treated product is dense and cohesive and is, therefore, easily filterable by conventional means. The amount of flocculating agent added to the beverage is entirely dependent on the oxygen content of the beer.

The beer is then received into the storage tank D, in which the suspended solids in the beer are allowed to be precipitated. The clear beer is decanated and passes from tank D, through a pipe 9 to a filter 10, thence to a tank 11, thence through a finishing filter 12 as a finished product ready for packaging.

As before stated, one of the main difficulties with powdered or granulated forms of chemical compositions being added to the beer in a dry state has been the tendency of the said compositions, such as a montmorillonite, like bentonite, to swell within the beer and become gelatinous therein. These gelatinous substances clog the filtering mediums and slow up the passage of beer therethrough.

In the instant invention the insoluble additive composition, having been placed previously in a state of colloidal dispersion, is inserted into the beer flow under pressure through the injector mechanism previously mentioned; and acted upon by the beer flow current it is completely and thoroughly dispersed throughout the content of the beer. Consequently the gelatinous characteristics of the additive do not thereby impair the filtering steps and also as a flocculating agent is preferably added, as described, it thereby further reduces any gelatinous quality of the additive calculated to impair the filtering processes.

While I have described my invention in more or less specific detail, it is not intended that the invention be limited thereto but that modifications and changes in details of the process may be incorporated within the spirit and scope of the appended claims.

I claim:

1. In a method for clarifying comestible liquids comprising alcoholic malt beverages and containing insoluble proteids, the steps comprising contacting said liquid with an adsorbent comprising an aqueous colloidal dispersion of a magnesium silicate, thereafter contacting said liquid with a flocculating agent comprising an aqueous bisulphite solution to flocculate said adsorbent and thereafter separating flocculated proteids and said adsorbent from said liquid.

2. In a method for clarifying comestible liquids comprising alcoholic malt beverages and containing insoluble proteids, the steps comprising contacting said liquid with an adsorbent for said proteids comprising an aqueous colloidal dispersion of a magnesium silicate, thereafter contacting said liquid with a flocculating agent comprising an aqueous sodium bisulphite solution to flocculate said adsorbent and thereafter separating flocculated proteids and said adsorbent from said liquid, said liquid being maintained at a temperature not exceeding approximately 35 degrees F. and above the freezing temperature of said liquid during said operations.

3. In a method for clarifying comestible liquids comprising alcoholic malt beverages and containing insoluble proteids, the steps comprising mixing an adsorbent comprising an aqueous colloidal dispersion of a magnesium silicate with said liquid in proportions ranging from approximately 5 to approximately 8 gallons of water containing from approximately 2 to approximately 4 pounds of magnesium silicate to each 100 barrels of liquid to be clarified, thereafter mixing a flocculating agent comprising an aqueous sodium bisulphite solution with said liquid and adsorbent in proportions amounting to approximately 2½ gallons of water containing approximately 1 pound of sodium bisulphite to each 100 barrels of liquid to flocculate said adsorbent and thereafter filtering flocculated proteids and said adsorbent from said liquid, said liquid being maintained at a temperature not exceeding approximately 35 degrees F. and above the freezing temperature of said liquid during said operations.

4. The method of treating an alcoholic malt beverage containing insoluble proteins comprising introducing into said beverage a preformed gelatinous colloidal clarifying dispersion medium formed by mixing a hydrophilic hydrated magnesium silicate with water, then contacting the so-treated beverage with a flocculating agent comprising an aqueous bisulphite solution to flocculate said dispersion medium, and thereafter separating the clarifying medium and the flocculated proteins from said treated beverage.

5. The method of treating an alcoholic malt beverage containing insoluble proteins comprising introducing into said beverage a preformed gelatinous colloidal clarifying dispersion medium formed by mixing a hydrophilic hydrated magnesium silicate with water, said magnesium silicate containing about 53.00% silica, about .60% alumina, about .50% lime, and about 25.00% magnesia, then contacting the so-treated beverage with a flocculating agent comprising an aqueous bisulphite solution to flocculate said dispersion medium, and thereafter separating the clarifying medium and the flocculated proteins from said treated beverage.

6. The method of treating an alcoholic malt beverage containing insoluble proteins comprising introducing into said beverage a preformed gelatinous colloidal clarifying dispersion medium formed by mixing a hydrophilic hydrated magnesium silicate with water, said magnesium silicate containing alumina in an amount not exceeding about .85%, then contacting the so-treated beverage with a flocculating agent comprising an aqueous bisulphite solution to flocculate said dispersion medium, and thereafter separating the clarifying medium and the flocculated proteins from said treated beverage.

7. The method of treating an alcoholic malt beverage containing insoluble proteins comprising introducing into said beverage a preformed pasty, flowable, gelatinous, substantially non-swellable, colloidal, hydrated, magnesium silicate clarifying medium, then contacting the so-treated beverage with a flocculating agent comprising an aqueous bisulphite solution to flocculate said dispersion medium, and then separating said clarifying medium and the flocculated proteins from said treated beverage, said beverage being maintained during said operations in a liquid form at a temperature below about 35° F.

8. The method of treating beer containing insoluble proteins comprising introducing into the beer a preformed flowable gelatinous colloidal clarifying medium formed by mixing a hydrophilic hydrated magnesium silicate with water, said clarifying medium being introduced into the beer in proportions ranging from approximately 5 to approximately 8 gallons of water containing approximately 2 to 4 pounds of magnesium silicate for each 3100 gallons of beer, then contacting the so-treated beer with a flocculating agent comprising an aqueous sodium bisulphite solution to flocculate said dispersion medium, the latter being added to the beer in proportions amounting to approximately 2.5 gallons of water containing approximately 1 pound of sodium bisulphite for each 3100 gallons of beer, and thereafter separating the clarifying medium and flocculated proteins from said treated beverage, said operations being carried out while the beer is in liquid form at a temperature below 35° F.

9. The method of treating an alcoholic malt beverage containing insoluble proteins comprising introducing into said beverage a preformed, flowable, gelatinous, colloidal, clarifying dispersion medium formed by mixing a natural hydrophilic hydrated magnesium silicate with water, and mixing the said clarifying medium with said malt beverage during introduction thereof to said beverage, then contacting the so treated beverage with a flocculating agent to cause said clarifying medium to precipitate, said flocculating agent being of a character and used in an amount not to affect deleteriously the qualitative character of the beverage, and thereafter separating the said clarifying medium and flocculated proteins from said treated beverage.

HANS JOACHIM.

REFERENCES CITED

The following references are of record in the file of this patent:

UNITED STATES PATENTS

| Number | Name | Date |
|---|---|---|
| 2,043,713 | Saywell | June 9, 1936 |
| 1,999,210 | Rempert | Apr. 30, 1935 |
| 2,203,614 | Goodwin | June 4, 1940 |
| 2,206,066 | Wallerstein | July 2, 1940 |
| 2,307,509 | H. Joachim | Jan. 5, 1943 |
| 2,291,624 | Heimann | Aug. 4, 1942 |
| 1,766,428 | Gozzolino | June 24, 1930 |
| 1,892,457 | Gozzolino | Dec. 27, 1932 |
| 508,882 | Hornbostel | Nov. 14, 1893 |
| 2,261,922 | Pittman | Nov. 4, 1941 |
| 1,234,255 | Ash | July 24, 1917 |

FOREIGN PATENTS

| Number | Country | Date |
|---|---|---|
| 465,692 | British | 1937 |
| 682,788 | German | Oct. 5, 1939 |
| 822,761 | French | Sept. 27, 1938 |
| 4,312 | British | 1874 |
| 8,420 | British | 1886 |

OTHER REFERENCES

Chemical Abstracts 31: 58312 Sulfites as protein precipitants, Campbell & Hanna, J. Biol. Chem. 119, 9–14.

Hopkins, et al., Biochemistry Applied to Malting and Brewing, Allen & Unwin Ltd., London, 1937 page 314. (Copy in Div. 63.)

Britton, Hydrogen Ions, vol. II (3 ed.), D. Van Nostrand Co. Inc., N. Y., pp. 106–113. (Copy in Div. 63.)

Thomas & Johnson, "The Mechanism of the Mutual Precipitation of Certain Hydrosols." Jr. Am. Chem. Soc., vol. 45, 1923, pages 2532 to 2541. (Copy in Scientific Library.)